2,839,444

FUNGICIDAL COMPOSITION COMPRISING 2, 4, DINITROFLUOROBENZENE AND METHODS OF USING SAME

Waldo B. Ligett, Pontiac, Mich., and Alfred J. Kolka, Clairton, Pa., assignors, by mesne assignments, to Pittsburgh Coke and Chemical Company, a corporation of Pennsylvania No Drawing. Application April 1, 1954
Serial No. 420,436

6 Claims. (Cl. 167—30)

This application is a continuation-in-part of application Serial No. 374,150, filed August 13, 1953, and now abandoned.

This invention relates to fungitoxic formulations. In particular this invention relates to fungicidal or fungistatic compositions wherein a principal active ingredient is an organic agent.

Organic fungicides have recently become increasingly important and have provided means for protecting material susceptible to attack by fungus organisms without resorting to the use of metallic compounds which have undesirable secondary properties. In particular, by the use of organic materials toxicity to mammals is largely reduced.

By fungistatic property it is intended to include actually killing fungus spores as well as prevention or inhibition of the sporulation of the fungi thereby preventing propagation and spreading of fungus attack. Attack by fungus organisms of susceptible materials takes several forms. In industrial applications fungus attack often results in the formation of mildew which is objectionable both because of its unsightly characteristics and also because it renders an article so attacked unfit for use. In agricultural applications fungus attack may take the form of actually destroying plant life, as in the damping-off of seedlings, or it may make agricultural crops unfit for consumption by unsightly or disease producing infestations. Many plant diseases are produced by fungi rather than by bacteria. In agricultural applications the agent may be applied to seeds, the plant, the harvest, or to the soil.

It has recently been determined that certain substitution products of benzene have fungicidal properties. In general, however, such benzene derivatives have contained a multiplicity of substituent groups, and in most instances at least one of such groups is what is generally considered as being labile groups. Such fungicides, while effective, have two serious disadvantages. The first, by virtue of their complexity, is based on the expense of manufacture, and the second relates to instability brought about by the above referred to labile groups. An example of such fungicides containing labile groups is the class of chlorofluoronitrobenzene compounds disclosed in U. S. 2,519,317. This discovery showed the importance of having at least one chlorine group, at least one fluorine group, and at least one nitro group coupled with the fact that the total of such groups on the molecule must be four or more.

It is an object of this invention to provide a material which produces effective fungicidal formulations having wide applicability. It is a further object of this invention to provide methods for inhibiting the spread of fungus attack. A still further object of this invention is to provide methods for protecting materials and to inhibit attack by fungus organisms. Still further objects comprise methods of protecting agricultural materials from fungus borne diseases and to provide methods for soil sterilization. A still further object is to provide methods for protecting a variety of industrial materials from fungicidal attack. A further object of this invention is to provide formulations for and methods of bio regulation. Still further objects will be apparent from the discussion which follows hereinafter.

The above and other objects of this invention are accomplished by providing formulations of 2,4-dinitrofluorobenzene and adjuvants therefor.

In order to obtain practical benefit from the inherent fungicidal activity of 2,4-dinitrofluorobenzene, the compound is employed as formulations with relatively inert, surface-contacting agents. In the pure state the above compound may be too effective or too potent in some applications to have practical utility as fungitoxicants. For example, in order to protect most effectively a surface such as a painted or wood surface, or the surface of a fruit, stem or leaf, or a concrete or other surface, it is preferred to apply the material in intimate contact but thoroughly dispersed on the surface thereof. Likewise, in treating more or less porous material such as cloth, felted textiles, and woven fibers, it is important that the materials be interspersed between the fine structure of such materials and be in intimate contact therewith. Therefore, in order to benefit from the discovery that the defined materials are effective fungicides, incorporated therewith is a relatively inert surface-contacting agent or adjuvant as a dispersing medium. Furthermore, such adjuvants have the effect of requiring only minute quantities of the above defined compounds in some formulations to obtain effective protection. A further advantage of so extending these materials is to permit field applications by methods readily employed and still obtain effectively complete coverage of the material being protected.

The formulations of this invention therefore comprise the hereinabove defined fungitoxic dinitrofluorobenzene and a suitable material as an adjuvant therefor. It is not intended that this invention be limited to any specific proportions of active ingredient and adjuvant. The important feature of the invention is to provide such an adjuvant that upon the preparation of a formulation of such concentration as appropriate for application the adjuvant will be present to provide the proper type of contact with the material being protected. Thus, in one embodiment the adjuvant can comprise a surface-active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage, and the like. Such a formulation lends itself directly to further dilution with the carrier without resorting to complicated mixing, blending, and grinding procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

It is also intended that the term "adjuvant" include solid carriers of the type of talc, pyrophyllite, Attaclay, kieselguhr, chalk, diatomaceous earth, and the like; and various mineral powders such as calcium carbonate and the like which act as a dispersant, as a carrier, and in some instances perform the function of a surface-active agent.

One utility of the dinitrofluorobenzene of this invention is its ability to prevent fungus, mildew, or mold attack in various industrial applications. Typical of such applications include incorporating these fungicidal dinitrofluorobenzenes in paints wherein certain ingredients of the paint provide the adjuvant action referred to above. Other surface coatings containing these dinitrofluorobenzenes are resistant to mildew which may occur on the outside of a surface treated with such surface coatings. Similarly, these dinitrofluorobenzenes are effective in protecting so called emulsion type paints which comprise a water emulsion of an oil, pigment, and coating vehicle. Upon standing exposed to atmospheric conditions such paints in the container are subject to fungicidal attack resulting in a breaking of emulsion and rendering the paint generally unfit for use. Other examples of applications of the dinitrofluorobenzenes of this invention include fabric mildew proofing, prevention of sap stain and mold on lumber, protection of plastics, in particular vinyl type plastics, preservatives for paper to prevent slime mold, in particular for cardboard containers subjected to high temperature and high humidity, and as a preservative for leather to prevent attack thereon by mildewing. In the above and other instances wherein these dinitrofluorobenzenes are effective preservatives, the feature of providing therewith an adjuvant is important to producing the greatest level of protection. Such adjuvants may be introduced as a preformed formulation with the fungitoxicant or can be present as an ingredient of the material being protected.

One method of applying our fungicide is in the form of a water suspension. However, to obtain a fungicidally active aqueous suspension, we employ a surface-active agent in sufficient amount to disperse and suspend the fungicidal agent. Examples of such surface-active agents which can be employed in forming dispersions include salts of the alkyl and alkylaryl sulfonates, such as Du Pont MP-189 and Nacconol-NR; alkyl sulfates, such as Dreft; alkylamide sulfonates, such as Igepon-T; the alkylaryl polyether alcohols, such as Triton X-100; the fatty acid esters of polyhydric alcohols, such as Span; the ethylene oxide addition products of such esters as, for example, Tween; and the addition products of long chain mercaptans and ethylene oxide, such as Sharples' Non-Ionic-218. Still other surface-active agents can be employed, the above merely showing a representative list of the more common materials.

A practical method of formulating 2,4-dinitrofluorobenzene comprises the preparation of a wettable powder. Such wettable powders have the advantage that a concentrated formulation is provided, stable on storage and readily transported to the site of application. Upon the mere addition of water to such a wettable powder, a formulation comprising 2,4-dinitrofluorobenzene dispersed in water along with a solid dispersed carrier is achieved. Such finished formulations have the advantage in use that they can be applied by conventional spray equipment, and when applied, the solid remaining after evaporation of the water forms a means of spreading the active ingredient on the surface and increasing its residual action.

In preparing wettable powders several formulation procedures are possible. Thus, it is one intention of this invention to provide compositions comprising 2,4-dinitrofluorobenzene in combination with a minor amount of a surface-active agent. Such surface-active agent can be chosen, for example, from among the following: alkyl and alkylaryl sulfonates, such as Du Pont MP-189 and Nacconol-NR; alkyl sulfates, such as Dreft; alkylamide sulfonates, such as Igepon-T; the alkylaryl polyether alcohols, such as Triton X-100; the fatty acid esters of polyhydric alcohols, such as Span; the ethylene oxide addition products of such esters as, for example, Tween; and the addition products of long chain mercaptans and ethylene oxide, such as Sharples' Non-Ionic-218. Still other surface-active agents can be employed, the above merely showing a representative list of the more common materials. Employing such formulated materials can thus comprise a simple admixture with a dust carrier. Such formulation then comprises 2,4-dinitrofluorobenzene, a surface-active agent, and the inert carrier. Among the inert carriers which can be successfully employed in thus preparing wettable powders are included, for example, soybean flour, tobacco flour, walnut shell flour, wood flour, sulfur, tripolite, diatomite, calcium lime, magnesium lime, calcite, dolomite, gypsum, mica, talc, pyrophyllite, montmorillonite, kaolinite, attapulgite, apatite, and pumice. In preparing such concentrated wettable powders it is preferred to employ between about 0.1 and 5 percent of the surface-active agent based upon the amount of active ingredient and from 25 to 85 percent of the inert carrier based upon the total amount of the formulation. Such formulations provide the advantage of permitting storage and transportation of the fungitoxicant and permit further dilution by simple admixture with water at the time of application. Thus, within the scope of this invention is also contemplated finished formulations for direct application comprising the fungitoxicant as defined herein, surface-active agents as illustrated above, and inert solid carriers as likewise illustrated above, all suspended in water. Such finished formulations, depending upon the application in mind, can include between about 0.1 to 10,000 p. p. m. of active ingredient. A preferred range for agricultural application is between 0.1 and 2,000 p. p. m. Typical formulations of such wettable powders of this invention are illustrated in the following:

*Example I*

A mixture of 100 parts of 2,4-dinitrofluorobenzene, 1000 parts of Attaclay, and 0.1 part of Nacconol was milled through a hammer mill and the resulting powder sieved to pass a 100-mesh screen. This 10 percent wettable powder produced a satisfactory water suspension when 11 parts were stirred into 10,000 parts of water to produce a suspension containing 100 p. p. m. active ingredient.

Other wettable powders comprising between 10 and about 80 percent active ingredient can be similarly produced using the above or other solid dispersants and surface-active agents providing concentrates of similar effectiveness. A preferred formulation comprises 25 percent active agent.

In addition to the above described method of wet application of 2,4-dinitrofluorobenzene, compositions can be prepared in which the materials are extended in talce, clay, or other solid diluents. Such carriers perform the adjuvant function as contact agents. Such formulations have particular utility in the treatment of seeds, wherein an aqueous application may promote premature germination, or where a solvent application may damage the seed. For certain field crop applications a dust formulation is also preferred wherein a wet application might introduce certain secondary effects which are undesirable. Further specific examples of such typical inert solid carriers which can be employed as diluents in the dust formulations include fuller's earth, pyrophyllite, Attaclay, and the Filtrols.

*Example II*

A dust formulation of 2,4-dinitrofluorobenzene was prepared as follows: one part of 2,4-dinitrofluorobenzene was placed in a hammer mill with 100 parts of fuller's earth. This mixture was milled for a period of one hour and screened to collect a fraction passing a 100-mesh sieve. This one percent by weight formulation can be applied directly or further diluted. A further dilution was made by repeating the above procedure with an additional 9,900 parts of fuller's earth.

For certain applications it is preferred to employ the fungicides in the form of oil-in-water emulsions. Thus, a concentrate of the fungicidal agent is prepared in a water-insoluble solvent, and this solution is then dispersed or emulsified in water containing a surface-active agent. Typical examples of such solvents include hydrocarbons, such as kerosene, benzene, or naphtha; higher alcohols, such as butanol, oleyl alcohol, or ethers and esters thereof; and chlorinated solvents, such as perchloroethylene and trichloroethylene.

*Example III*

An oil-in-water emulsion was prepared by dissolving 10 parts of 2,4-dinitrofluorobenzene in 1000 parts of kerosene. This solution was dispersed with vigorous agitation in 99,000 parts of water containing 1 part of Triton X-100 to provide a dispersion containing 10 p. p. m. of active agent.

In addition, we have found that we can incorporate an adherent or sticking agent, such as vegetable oils, naturally occurring gums, and other adhesives, in our 2,4-dinitrofluorobenzene formulations. Likewise, we can employ humectants in our formulations. Furthermore, these formulations can be employed in admixture with other fungicidal materials or other biocides, such as insecticides, larvicides, bactericides, vermicides, miticides, or with other materials which it is desired to apply along with our fungicides, such as, for example, herbicides or fertilizers.

We have illustrated the utility of our fungicides as fungitoxic materials by determining the concentration at which the germination of 50 percent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of our fungicides to protect these and other important agricultural crops.

The standard procedure for determining the above referred to effectiveness comprises dissolving the material to be applied in ten times the amount of acetone containing one-tenth the amount of a surface-active agent, Triton X-155. This solution is thereupon diluted to the desired concentration with distilled water. This suspension at various dilutions with distilled water was applied to a drop of water containing the test organism on a microscope slide. The concentration was thereby determined at which one-half of the fungi were prevented from sporulating. This standard slide-germination method is described and accepted by the Committee on Standardization of Fungicidal Tests of the American Phytopathological Society in "Phytopathology," 33, 627 (1943).

By the above described determination it was found that the concentration in p. p. m. to inhibit sporulation by 50 percent ($ED_{50}$) of the two organisms was 0.05 and 0.5 respectively. It is interesting to note that similar materials having more active halogen, namely, 2,4-dinitrochlorobenzene and 2,4-dinitrobromobenzene, were similarly effective at only approximately ten times the concentration. However, substitution of a bromine atom into the 2,4-dinitrofluorobenzene nucleus as in 2,4-dinitro-5-bromofluorobenzene results in enhanced activity against some species.

Of particular utility is the ability of 2,4-dinitrofluorobenzene formulations to protect seeds from fungicidal attack. For example, when cotton or pea seeds are so treated, not only are the seeds protected on storage, but upon planting, damping-off of the seedling is prevented. The formulations of this invention have been found to be effective at concentrations of as little as one-fifth that required by certain commercially employed fungicides containing active metals. Not only are our formulations more effective but they provide protection without contamination of the seed with metals injurious to human and animal life, important in edible products.

The volatility of 2,4-dinitrofluorobenzene is an advantage when the material is used as a soil treatment agent. Thus, large soil areas can be treated, with uniform distribution of the active ingredient resulting. Similarly, treatment of articles susceptible to fungus attack in closed containers is conveniently provided by incorporating in such container, or by applying directly to the material to be protected, a formulation as defined herein.

Among other uses of the formulations of this invention is the treatment of cereal seeds for smut control. For such treatment a dry formulation is prepared to avoid damage to the seed or stimulation of premature germination.

The chemical 2,4-dinitrofluorobenzene can be prepared by several convenient routes. One method comprises the nitration of fluorobenzene with a mixture of nitric and sulfuric acids; for example, 18 percent nitric, 82 percent sulfuric. By employing this procedure we have obtained the active ingredient in 81 percent yield. The nitration was conducted at a temperature of 30 to 50° C. and completed by increasing the temperature of the reaction mixture to 100° C. The product, of suitable purity for use as a fungicide, melted at 21–28° C An alternative procedure for preparing 2,4-dinitrofluorobenzene comprises the dinitration of chlorobenzene by a procedure similar to that described above followed by replacement of the chlorine atom with fluorine by reacting 2,4-dinitrochlorobenzene with a metallic fluoride. The fluorides of the alkali and alkaline earth metals are economically advantageous, although the fluorides of the heavy metals, such as arsenic, antimony, lead, nickel, and the like, can likewise be employed. In effecting this exchange reaction improved results can be obtained by employing solvents, among which the alkyl formamides, such as dimethylformamide, are preferred. Other suitable solvents include nitrobenzene and the like.

The amount of active ingredient employed in providing protection against fungicidal attack is determined largely by the material being treated. Thus, as a soil fungicide, we prefer to employ dosages on the order of one-half to 15 pounds of active ingredient per acre of soil treated. For agricultural applications we prefer to employ formulations containing between about 0.1 and 2,000 p. p. m. of active ingredient. A preferred formulation comprises a concentrate consisting of 25 weight percent 2,4-dinitrofluorobenzene, a solid carrier, and about 1 percent surface-active agent.

To illustrate the effectiveness of the fungicidal agent of this invention, soil burial tests were conducted to demonstrate in particular its effectiveness as fabric preservative. This demonstrates not only its utility as a fabric preservative but demonstrates the ability of the material to control fungi in soil; that is, perform soil sterilization. The method comprises the following:

Duplicate strips of eight-once cotton duck, 1½ inches by 6 inches, with the long dimension parallel to the warp, are treated by dipping them into a 2.0 percent solution of the test chemical dissolved in acetone or other suitable solvents. They are allowed to dry and then planted vertically in wooden boxes containing soil infested with cellulose-destroying fungi. Standard reference chemicals and checks are also included in the test box which is incubated at 80° F. for about two weeks. At the end of the exposure period the test specimens are removed from the soil bed and if not completely degraded, gently washed to remove soil, air dried, and breaking strength determined if required.

The following results were obtained measured as percent of the original tensile strength of the sample retained after immersion; the checks, zero, 2,4-dinitrofluorobenzene, 84 percent.

In addition to fungicidal activity, we have determined that under some conditions of application and against some species, 2,4-dinitrofluorobenzene is an insecticide and a non-selective herbicide.

Having disclosed typical methods of formulation and application to provide the benefits of our discovery, we do not intend to be limited except by the appended claims.

We claim:

1. A soil treatment agent comprising 2,4-dinitrofluorobenzene, a solid dispersant, and a surface-active agent.
2. A fungicidal composition consisting essentially of about 25 weight percent 2,4-dinitrofluorobenzene, a solid dispersant, and a surface-active agent.
3. A fungicidal composition consisting essentially of 2,4-dinitrofluorobenzene and a surface-active agent.
4. The method of preventing sporulation of fungi, which consists of subjecting fungi to the action of 2,4-dinitrofluorobenzene formulated with a surface-active agent.
5. The method of soil treatment which consists of applying a formulation of 2,4-dinitrofluorobenzene to the soil.
6. The method of protecting seeds which comprises applying thereto a formulation of 2,4-dinitrofluorobenzene.

References Cited in the file of this patent

UNITED STATES PATENTS

| 2,519,317 | Kolka et al. | Aug. 15, 1950 |
| 2,583,425 | Hawley | Jan. 22, 1952 |

FOREIGN PATENTS

| 700,185 | Great Britain | Nov. 25, 1953 |

OTHER REFERENCES

Frear: "Catalogue of Insecticides and Fungicides," vol. I, p. 45.

Frear: "Catalogue of Insecticides and Fungicides," vol. II, p. 28, pub. by Chronica Botanica Co., Waltham, Mass.

Beilstein: Erstes Erganz., 1930, Band 5, p. 136.